March 30, 1926.
C. A. BORNMANN
1,578,635
CAMERA
Filed May 13, 1925
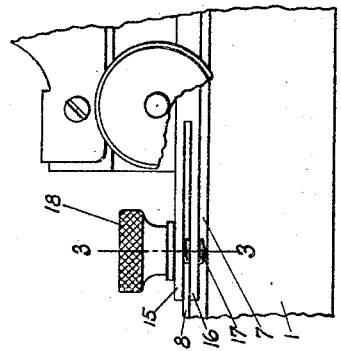
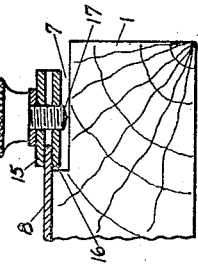
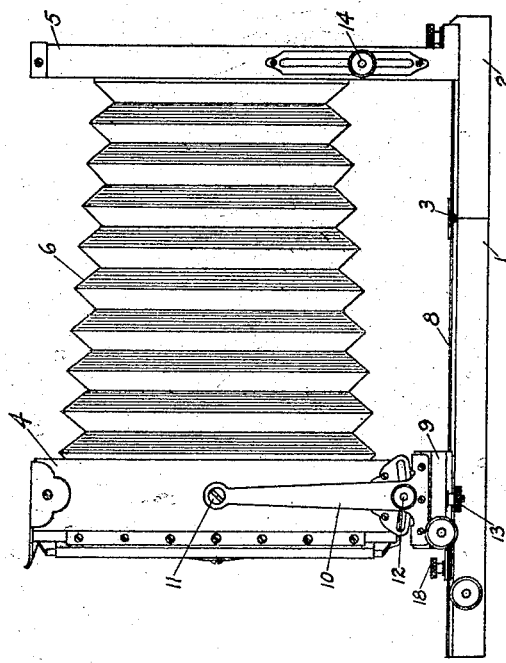
INVENTOR
CARL A. BORNMANN
BY
Philip S. Hopkins
ATTORNEY Patented Mar. 30, 1926.

1,578,635

UNITED STATES PATENT OFFICE.

CARL A. BORNMANN, OF BINGHAMTON, NEW YORK, ASSIGNOR TO ANSCO PHOTO-PRODUCTS, INC., OF BINGHAMTON, NEW YORK.

CAMERA.

Application filed May 13, 1925. Serial No. 29,978.

*To all whom it may concern:*

Be it known that I, CARL A. BORNMANN, a citizen of the United States, and a resident of Binghamton, county of Broome, and State of New York, have invented a certain new and useful Improvement in a Camera, of which the following is a description, reference being had to the accompanying drawing, which forms a part of this specification.

My invention relates to cameras and particularly to that type known as a view camera, wherein an extension is provided between the lens carrying board and the plate or film holder, in the form of a bellows. It will be understood by those skilled in the art that in such cameras, either or both the lens board and the film or plate holder are capable of movement along a supporting track or base for the purpose of focusing.

It is the primary object of my invention to provide a novel and effective clamping device for the movable parts of the camera whereby after the same has been adjusted to the desired position, it may be securely clamped or locked against further movement.

A second object is to so construct this clamping device that it will serve the additional purpose of insuring greater rigidity to the movable part of the camera on its track or rail.

A further object is to render this clamping device simple and of such construction that it may be easily and quickly manipulated by the operator, and which will remain in secured or locked position without danger of accidental displacement until the device is again released.

Other objects and advantages in details of construction and operation will be apparent as the description proceeds, reference being had to the accompanying drawing wherein like reference numerals indicate like parts.

In the drawing:

Figure 1 is a side view of a photographic camera to which my invention is attached.

Figure 2 is a side view of my improved clamping device showing the same in detail.

Figure 3 is a detail taken on the line 3—3 of Figure 2 and showing the clamping device in section.

While I have illustrated my invention as used in connection with a camera of the type ordinarily used for portrait work and known as a view camera, it will be readily understood that the device is susceptible to a wide variety of cameras wherein an extension or movement of a part thereof is necessary for focusing.

In Figure 1 of the drawing, I have illustrated a supporting base for a camera formed in the two parts, 1 and 2. These parts are hinged together as at 3, so that when the plate holder 4 of the camera occupies a point adjacent the lens board 5 with the bellows 6 collapsed between the two parts, and both parts resting on the section 2 of the base, the section 1 may be folded up to facilitate the carrying or storing of the camera.

The supporting base is provided on either side with a groove or cut out portion 7 overhanging which is a plate 8 providing a rail upon which the support for the plate holder 4 is slidable. This support is designated by the reference numeral 9, and is provided with a bracket 10 to which the plate holder 4 is pivoted at 11. The usual adjustment 12 and 13 are provided for permitting the angular and lateral adjustment of the plate holder 4. An adjustment 14 is also provided on the lens board 5 for the rise and fall adjustment thereof. These various parts just described are conventional in design and form no part of this invention.

The sliding support 9 carries at the front end a projecting split plate or guide, the upper and lower parts 15 and 16 thereof engaging upon opposite sides of the overhanging or projecting track 8.

Adjacent their outer ends, these clamping portions 15 and 16 receive a set screw 17 provided with a knurled handle or thumb piece 18, which when screwed down, is adapted to clamp the plate 15 and 16 firmly on either side of the track 8, thereby locking the movable supporting base 9 and consequently the plate holder 4 in adjusted position. Loosening of the set screws 17 will, of course, relieve the clamping action and permit movement of the base 9 along the track 8 for the purpose of focusing.

It will thus be seen that I have provided a simple, yet effective locking or clamping means to secure the plate holder or other movable parts of the camera in adjusted position after the focusing operation has been performed. Such clamping action not only secures the movable part of the camera against accidental displacement, but also lends rigidity to the camera as a whole and prevents any slipping or vibration due to a loose or insecure fastening means.

It will be understood from the foregoing, that my invention is adaptable to any type of camera provided with a movable part slidable on a track for focusing. I do not limit myself therefore to the exact construction shown and described herein other than by the appended claim.

I claim:

A camera including a support provided with a recess along one edge thereof, a rail mounted on said support and overhanging said recess, a camera element movable on said rail and provided with guiding means engaging the same, an independent split plate also carried by said element and embracing said rail on the top and bottom thereof, and a set screw passing through said plate for drawing the same into locking engagement with said rail.

CARL A. BORNMANN.